(12) United States Patent
Aoki et al.

(10) Patent No.: US 10,892,697 B2
(45) Date of Patent: Jan. 12, 2021

(54) MOTOR CONTROL APPARATUS AND METHOD OF CONTROLLING THE SAME

(71) Applicant: CANON KABUSHIKI KAISHA, Tokyo (JP)

(72) Inventors: Kunitoshi Aoki, Tokyo (JP); Jumpei Ashida, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/377,356

(22) Filed: Apr. 8, 2019

(65) Prior Publication Data

US 2019/0319565 A1  Oct. 17, 2019

(30) Foreign Application Priority Data

Apr. 11, 2018  (JP) ................. 2018-076243

(51) Int. Cl.
  *H02P 21/18*  (2016.01)
  *H02P 25/03*  (2016.01)
  *H02P 21/00*  (2016.01)

(52) U.S. Cl.
  CPC .......... *H02P 21/18* (2016.02); *H02P 21/0003* (2013.01); *H02P 25/03* (2016.02)

(58) Field of Classification Search
  CPC .... H02P 6/20; H02P 21/00; H02P 1/00; H02P 1/04; H02P 1/46; H02P 3/00; H02P 3/12; H02P 3/14; H02P 3/16; H02P 3/18; H02P 6/00; H02P 6/002; H02P 6/005; H02P 6/008; H02P 6/06; H02P 6/08; H02P 6/12; H02P 6/14; H02P 21/0092; H02P 21/0035; H02P 21/0003; H02P 21/146; H02P 7/00; H02P 23/00; H02P 25/00; H02P 27/00; H02P 21/18; H02P 21/26; H02P 21/22; H02P 25/03
  USPC .... 318/400.01, 400.02, 400.14, 400.15, 700, 318/701, 721, 779, 799, 800, 801, 400.32
  See application file for complete search history.

(56) References Cited

U.S. PATENT DOCUMENTS 6,979,970 B2 * 12/2005 Iwanaga ............. H02P 6/182
                                       318/400.35
8,159,162 B2 *  4/2012 Kanamori .......... H02P 6/20
                                       318/400.11
9,444,377 B2 *  9/2016 Sato ................... H02P 1/46
(Continued)

FOREIGN PATENT DOCUMENTS

JP    2015213398 A    11/2015
JP    2016181945 A    10/2016

*Primary Examiner* — Antony M Paul
(74) *Attorney, Agent, or Firm* — Rossi, Kimms & McDowell LLP

(57) ABSTRACT

In order to shorten an activation time while realizing high accuracy motor control, a motor control apparatus operable to control a motor is provided. The apparatus comprises: a first drive control unit configured to drive the motor by forced commutation control; a second drive control unit configured to drive the motor by vector control; and a control unit configured to control to drive the motor by one of the first drive control unit and the second drive control unit. A first control period which is a control period in which the first drive control unit controls the motor is shorter than a second control period which is a control period in which the second drive control unit controls the motor.

20 Claims, 9 Drawing Sheets

(56) References Cited

U.S. PATENT DOCUMENTS 9,998,048 B2   6/2018  Maeshima
2018/0175765 A1* 6/2018  Ishikawa ................. H02P 21/22

* cited by examiner

MOTOR CONTROL APPARATUS AND METHOD OF CONTROLLING THE SAME

BACKGROUND OF THE INVENTION

Field of the Invention

The present invention relates to control of a motor.

Description of the Related Art

In a laser beam printer, a brushless DC motor or the like is used for driving of a photosensitive drum or a transfer belt. Typically, a brushless DC motor has a three-phase (a U phase, a V phase, and a W phase) stator, and the motor is caused to rotate by controlling voltages applied to these phases. At this point, a rotation speed that changes in accordance with a load or the like is detected and fed back to control to realize a stable rotation speed.

Conventionally, the rotation speed is measured using a Hall sensor or the like, but in recent years, a method (sensorless vector control) for estimating rotation speed from current values for the three phases without using a sensor, and then performing vector control has been widely used (for example, Japanese Patent Laid-Open No. 2015-213398). However, to estimate a rotation speed without a sensor, it is necessary for the motor to be rotating at a relatively high rotation speed and for a sufficient induced current to be generated. In view of this, a method (a forced commutation mode) for causing a motor to forcibly rotate in accordance with commutation (an operation for applying a voltage to a respective phase to create a rotating magnetic field) in a period of time from activation to where the rotation speed has increased by a certain degree is in use (for example, Japanese Patent Laid-Open No. 2016-181945). After the motor has reached a relatively high rotation speed, there is a switch from the forced commutation mode to sensorless vector control.

However, in a case of shortening an amount of time from activation until the motor reaches a target rotation speed, it is necessary to drive by a high torque to increase the acceleration of the motor. To increase the torque it is necessary to supply more current and increase the frequency faster. Accordingly, in the forced commutation mode, it is necessary to control so that the voltage applied to the stator sharply changes.

SUMMARY OF THE INVENTION

According to one aspect of the present invention, a motor control apparatus operable to control a motor, the apparatus comprises: a first drive control unit configured to drive the motor by forced commutation control; a second drive control unit configured to drive the motor by vector control; and a control unit configured to control to drive the motor by one of the first drive control unit and the second drive control unit, wherein a first control period which is a control period in which the first drive control unit controls the motor is shorter than a second control period which is a control period in which the second drive control unit controls the motor.

The present invention provides a technique for shortening activation time while realizing high accuracy motor control.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Explanation is given in detail below, with reference to the drawings, of examples of embodiments of the invention. Note, the following embodiments are only examples and are not intended to limit the scope of present invention.

First Embodiment

Description is given below by taking, as an example, an electrophotographic method image forming apparatus as a first embodiment of a motor control apparatus according to the present invention.

<Apparatus Configuration>

Figure 1:
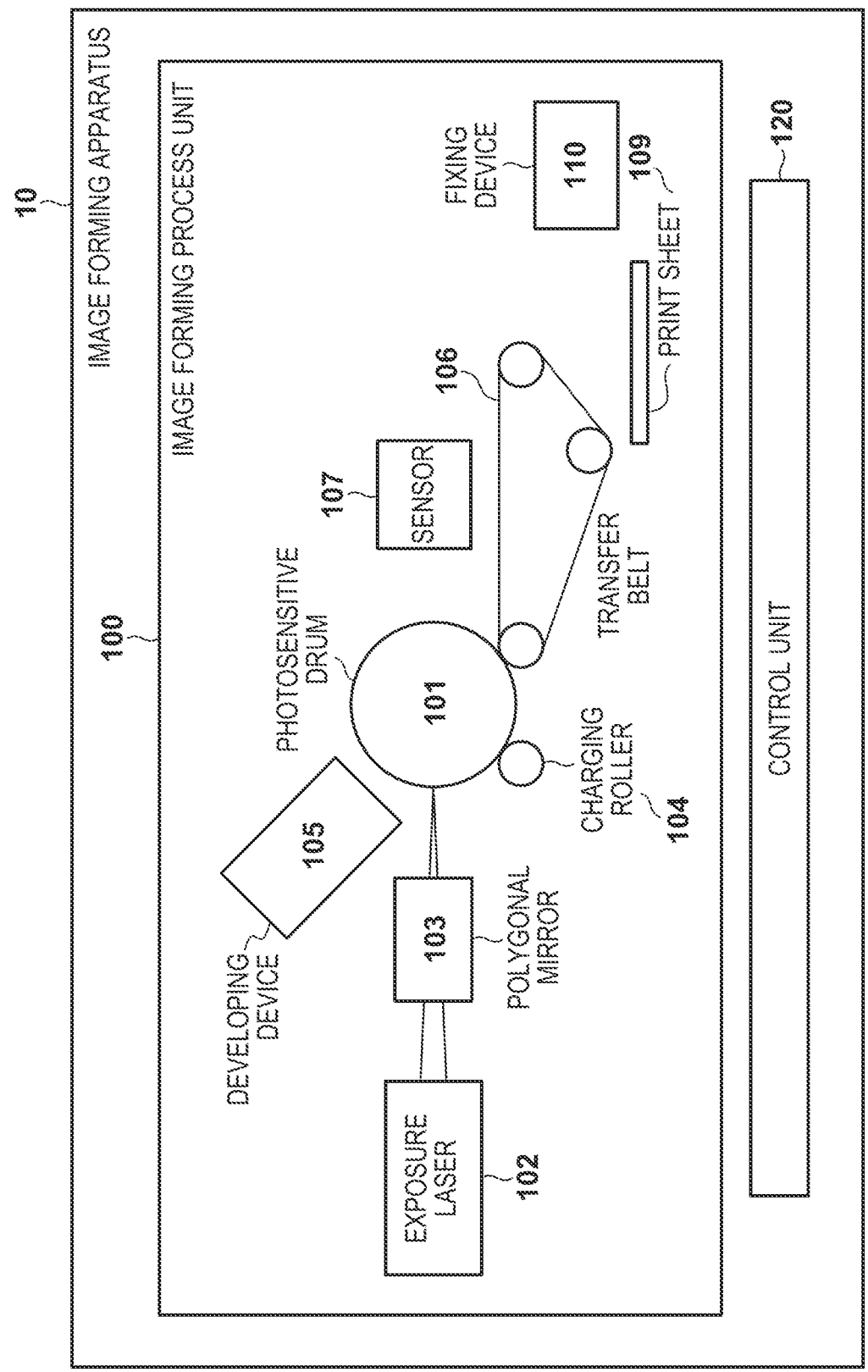
FIG. 1 exemplarily illustrates a configuration of an image forming apparatus according to a first embodiment.

FIG. 1 is a view that exemplarily illustrates a configuration of an image forming apparatus 10 according to a first embodiment. The image forming apparatus 10 is configured by an image forming process unit 100 and a control unit 120.

The image forming process unit 100 is configured by a photosensitive drum 101 as an image carrier, an exposure laser 102, a polygonal mirror 103, a charging roller 104, a developing device 105, a transfer belt 106, a sensor 107, and a fixing device 110.

An outline regarding a series of processes for image forming by the image forming process unit 100 will be given. Firstly, the surface of the photosensitive drum 101 is charged by the charging roller 104, and the exposure laser 102 irradiates, via the polygonal mirror 103, the photosensitive drum 101, which is a rotary member that is driven by a motor, to generate an electrostatic latent image. Next, a toner image is formed on the photosensitive drum 101 by the developing device 105, and the toner image is transferred to the transfer belt 106. Furthermore, the toner image on the transfer belt 106 is transferred to a print sheet 109, and finally the fixing device 110 is used to cause the toner image to fix to the print sheet 109.

The sensor 107 is a functional unit for capturing a toner image on the transfer belt 106 for a purpose such as calibration of a toner amount or color misregistration (in the case of color printer). The control unit 120 is a functional unit for controlling various processes such as charging, exposure, development, transfer, and fixing. In addition, the control unit 120 controls rotation of a brushless DC motor (not shown) to control conveyance of the transfer belt 106 and rotation of the photosensitive drum 101. Further description is given below regarding a motor control unit 200 which is included in the control unit 120.

<Motor Control Unit>

The brushless DC motor normally controls voltages to apply to a three-phase stator to thereby realize a desired rotation speed for a rotor. Here, it is envisioned that the brushless DC motor is controlled in accordance with sensorless vector control for controlling the motor based on a rotation speed estimated from current values of the three phases, or forced commutation control for forcibly driving the motor without using an estimation result.

Figure 2:
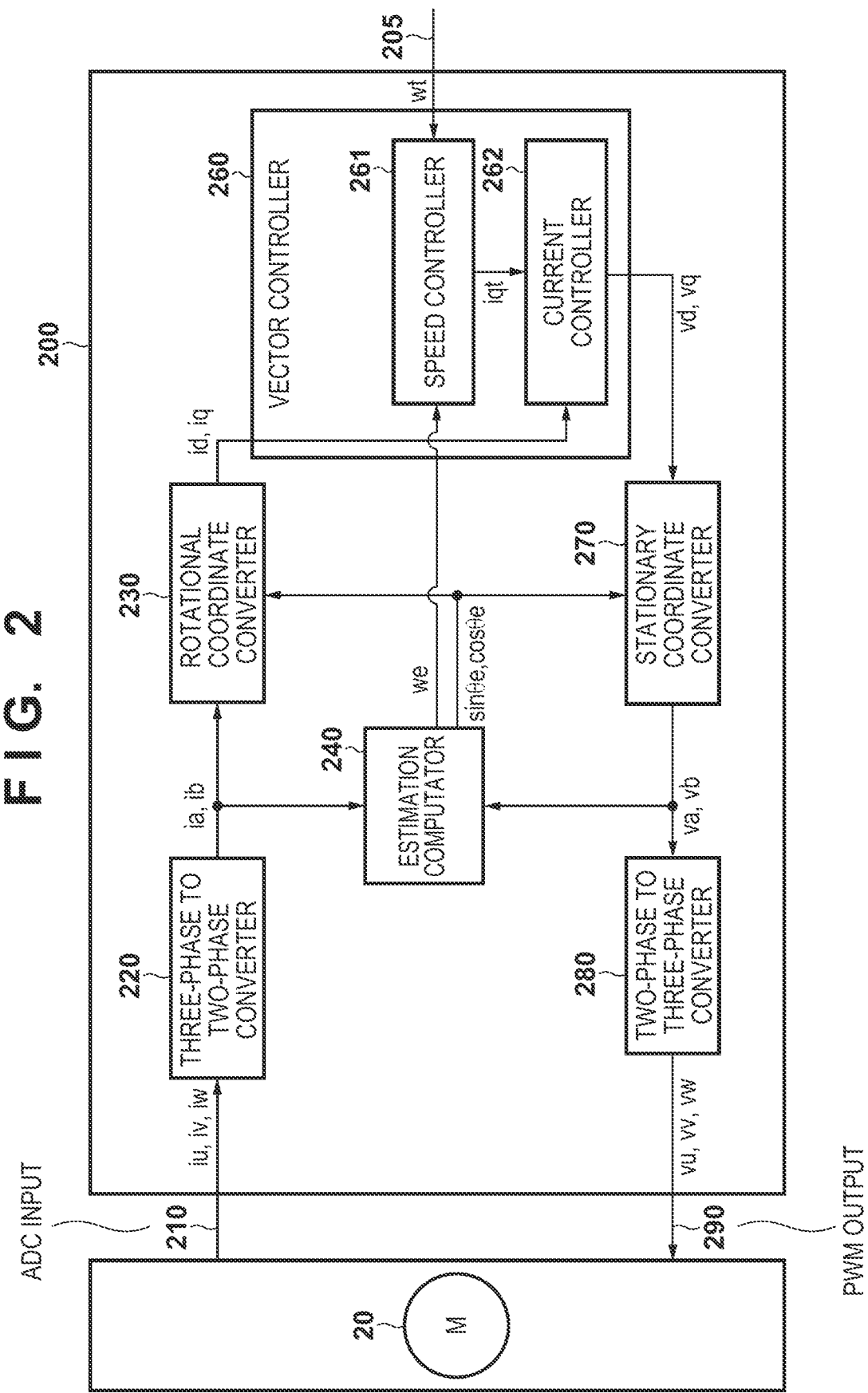
FIG. 2 is a block diagram of a motor control unit.

FIG. 2 is a block diagram of the motor control unit 200 included in the control unit 120.

The motor control unit 200 outputs three-phase current operation amounts for driving a brushless DC motor 20, based on an inputted speed command value and current values for the three phases. The "current operation amount" is a voltage command value that indicates a voltage to be applied. Let the speed command value inputted from an input port 205 be wt, and let the current values for the three phases (a U phase, a V phase, and a W phase) inputted from an input port 210 via an ADC (Analog to Digital Converter) (not shown) be iu, iv, and iw. In addition, let the current operation amounts for the three phases (U phase, V phase, and W phase) that are outputted from an output port 290 be vu, vv, and vw.

The motor control unit 200 repeatedly executes sensorless vector control and forced commutation control for respectively suitable predetermined periods to thereby realize stable rotation. Note that it is assumed that a processor (a CPU) executes a program to thereby realize the motor control unit 200 by software. However, configuration may be taken such that some or all of the motor control unit 200 is realized by hardware such as an FPGA or a custom LSI.

As described above, as motor control, the motor control unit 200 performs sensorless vector control which is closed loop control (feedback control) and forced commutation control which is open loop control (feedforward control). Description is given below regarding operation of the motor control unit 200 in sensorless vector control and forced commutation control.

Sensorless Vector Control

A three-phase to two-phase converter 220 performs a coordinate conversion process on the inputted U-phase current value iu, V-phase current value iv, and W-phase current value iw to obtain an α-axis current value ia and a β-axis current value ib. Here, the α-β axes represent a stationary coordinate system. For example, the α-axis can be set to one of the phase directions, such as the U-phase direction, for example, and the β-axis can be set to a direction that is orthogonal to the α-axis. Note that configuration may be taken to obtain ia and ib from current values of any two phases of in, iv, and iw.

A rotational coordinate converter 230 obtains a d-axis current value id and a q-axis current value iq from the α-axis current value ia and the β-axis current value ib, in accordance with a coordinate conversion process. Here, the d-q axes represent a rotating coordinate system. For example, the d-axis can be set to a predetermined direction of a rotor, such as the direction of an N(north)-pole, for example, and the q-axis can be set to a direction that is orthogonal to the d-axis. Note that the rotational coordinate converter 230 uses an element of a rotation matrix (sin θe and cos θe) with respect to a phase outputted by an estimation computator 240 (in other words, a phase difference between the α-axis and the d-axis), in the coordinate conversion process.

A vector controller 260 includes a speed controller 261 and a current controller 262. The speed controller 261 determines a q-axis current command value iqt for adjusting the speed of the rotor from the speed command value wt and the estimated speed we of the rotor which is outputted by the estimation computator 240. The current controller 262 obtains the d-axis current operation amount vd and the q axis current operation amount vq from the q-axis current command value iqt calculated by the speed controller 261, and the d-axis current value id and the q-axis current value iq inputted from the rotational coordinate converter 230, and outputs the d-axis current operation amount vd and the q axis current operation amount vq to a stationary coordinate converter 270.

The stationary coordinate converter 270 performs a coordinate conversion process based on a rotation matrix from the estimation computator 240. Specifically, by the coordinate conversion process, an α-axis current operation amount va and a β-axis current operation amount vb are obtained from the d-axis current operation amount vd and the q axis current operation amount vq. A two-phase to three-phase converter 280 performs a coordinate conversion process on the α-axis current operation amount va and the β-axis current operation amount vb to obtain the U-phase current operation amount vu, the V-phase current operation amount vv, and the W-phase current operation amount vw. The obtained U-phase current operation amount vu, V-phase current operation amount vv, and W-phase current operation amount VW are outputted to a PWM (Pulse Width Modulation) control circuit (not shown) of the motor.

The estimation computator 240 obtains an estimated speed and a rotation matrix from the α-axis current operation amount va, the β-axis current operation amount vb, the α-axis current value ia, and the β-axis current value ib, and outputs the estimated speed and the rotation matrix.

Forced Commutation Control

In a state where the motor is stopped or the rotation speed is low (a state where the rotation speed is less than a predetermined threshold value), an induced current flowing through a respective phase of the motor is weak, and it is not possible to calculate the estimated speed we with sufficient accuracy. Accordingly, when the motor is activated, forced commutation control (open loop control) for causing the motor to rotate by forcibly supplying current at a predetermined period is used instead of sensorless vector control that uses the three-phase to two-phase converter 220, the rotational coordinate converter 230, and the estimation computator 240.

In forced commutation control, to drive the motor by a torque in accordance with an envisioned load, the vector controller 260 outputs a d-axis current operation amount vd and a q axis current operation amount vq to have a predetermined current forcibly flow in the motor.

<Operation of Apparatus>

Description is given below regarding a method of high speed activation of a motor in the first embodiment. As an overview, this is a method for performing forced commutation control in an initial period of activation, and transitioning to sensorless vector control after a rotation speed of the motor for generating a sufficient induced current (a predetermined threshold value) is reached.

Figure 3:
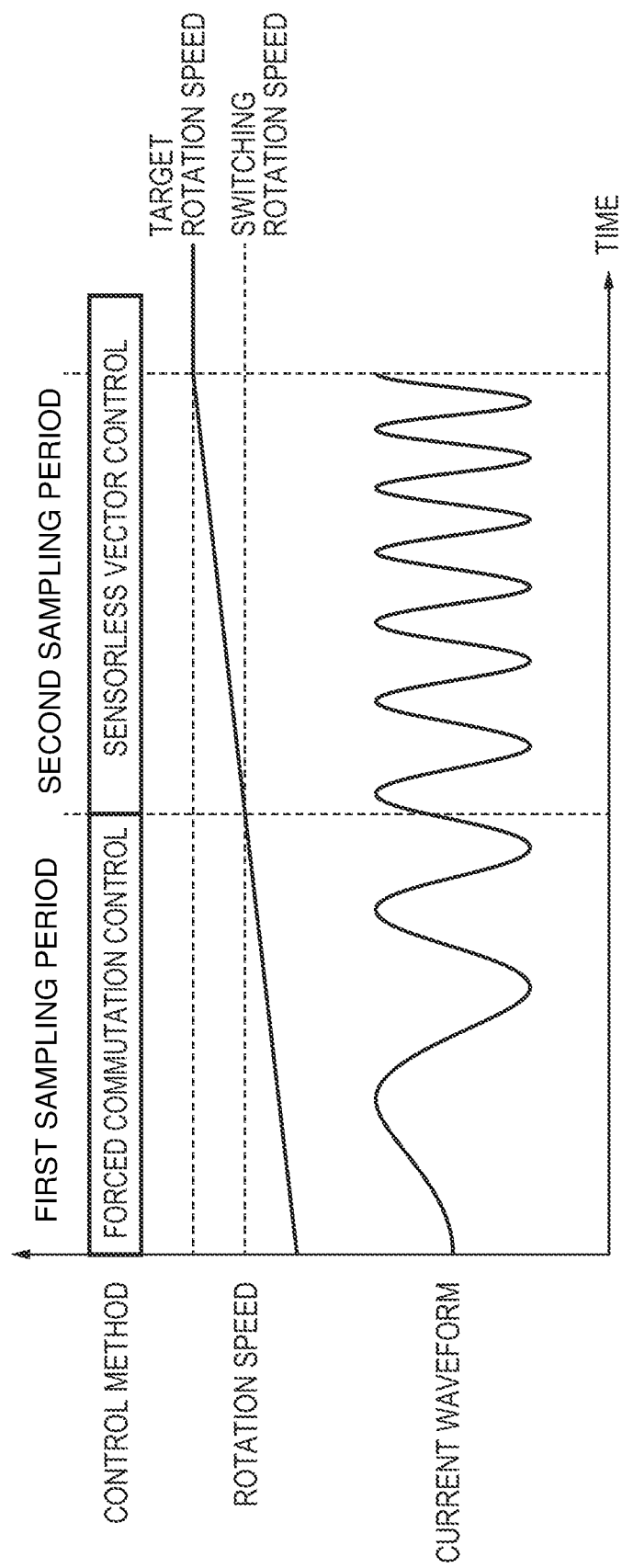
FIG. 3 exemplarily illustrates a transition of a motor current, and switching control for when a motor is activated.

FIG. 3 exemplarily illustrates a transition of a motor current, and switching control for when a motor is activated. More specifically, by forced commutation control, the motor is caused to start and accelerate, and after the rotation speed of the motor has reached a region for generating a sufficient induced current (a switching rotation speed) (after the rotation speed has reached a predetermined threshold value or more), a switch is made to sensorless vector control, and the rotation speed increases until a target rotation speed. Here, to expedite the completion of printing and reduce waiting time for a user as much as possible, it is important to shorten an activation time for the motor to reach a predetermined rotation speed.

Figure 4:
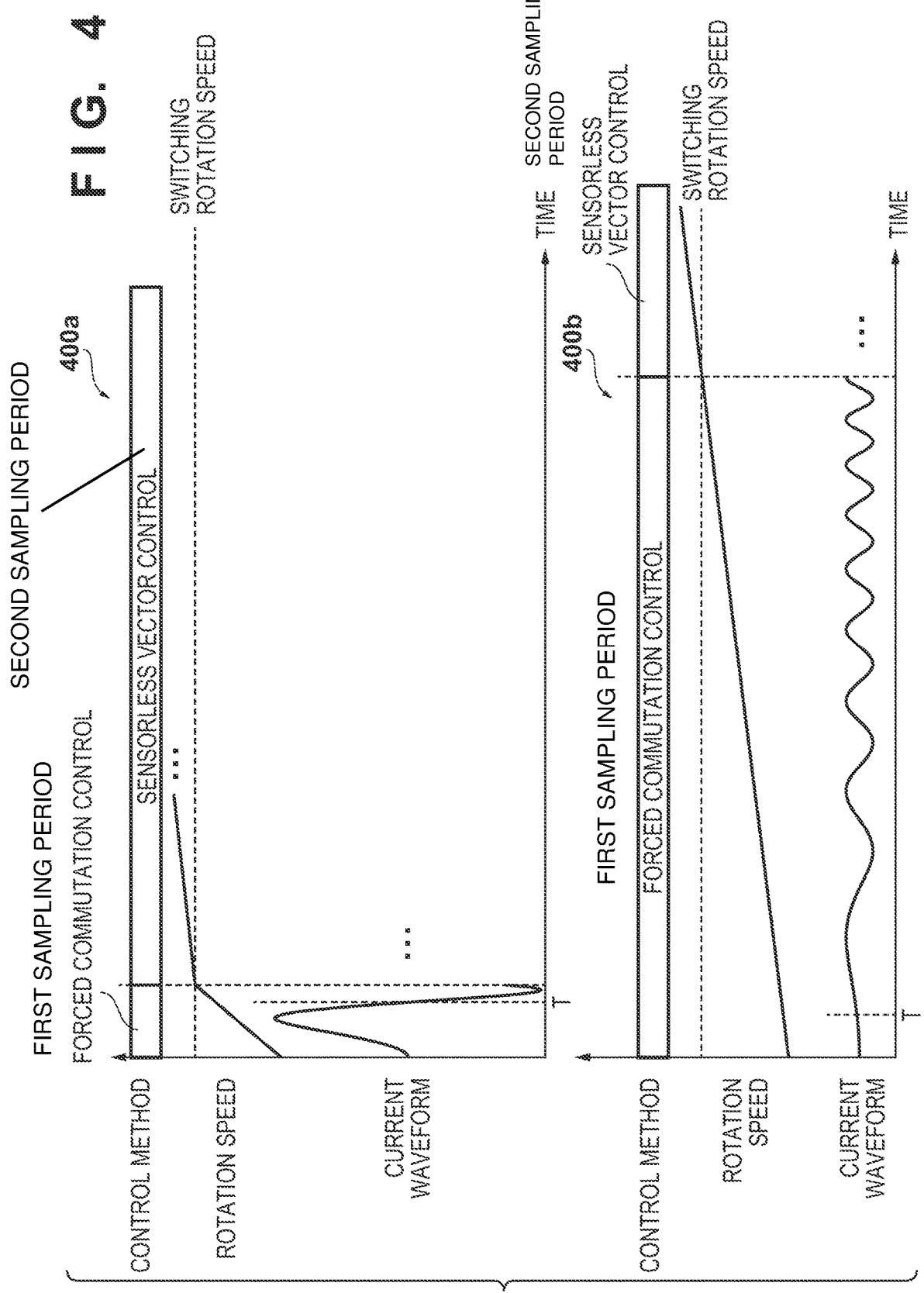
FIG. 4 is a view for comparing high speed activation and normal activation.

FIG. 4 is a view for comparing high speed activation and normal activation. A graph 400a exemplarily illustrates change of a control method, a rotation speed, and a current waveform at a time of high speed activation, and a graph 400b exemplarily illustrates change of a control method, a rotation speed, and a current waveform at a time of normal activation. The graph 400a illustrates changes for a case where the activation time of a motor has been shortened to approximately one tenth. In sensorless vector control, it is necessary to execute complex processing for various coordinate conversions, current control, speed control, or a speed estimate by the estimation computator 240. Because there are limitations on shortening a motor control period in an environment where calculation resources are limited such as with a microcontroller, control of rapid acceleration is difficult.

Consequently, consideration is given to shortening the activation time of the motor by shortening the time period before sensorless vector control is switched to be increasing the acceleration at a time of forced commutation control. However, to increase the acceleration, it is necessary to supply a higher current to drive the motor at a high torque. Furthermore, as the rotation speed of the motor increases, the period of the current waveform decreases (the frequency increases). Accordingly, as illustrated by the graph 400a, the current waveform in high speed activation has a larger amplitude and has a sharp waveform with large temporal variation, in comparison to the current waveform in normal activation.

Figure 5:
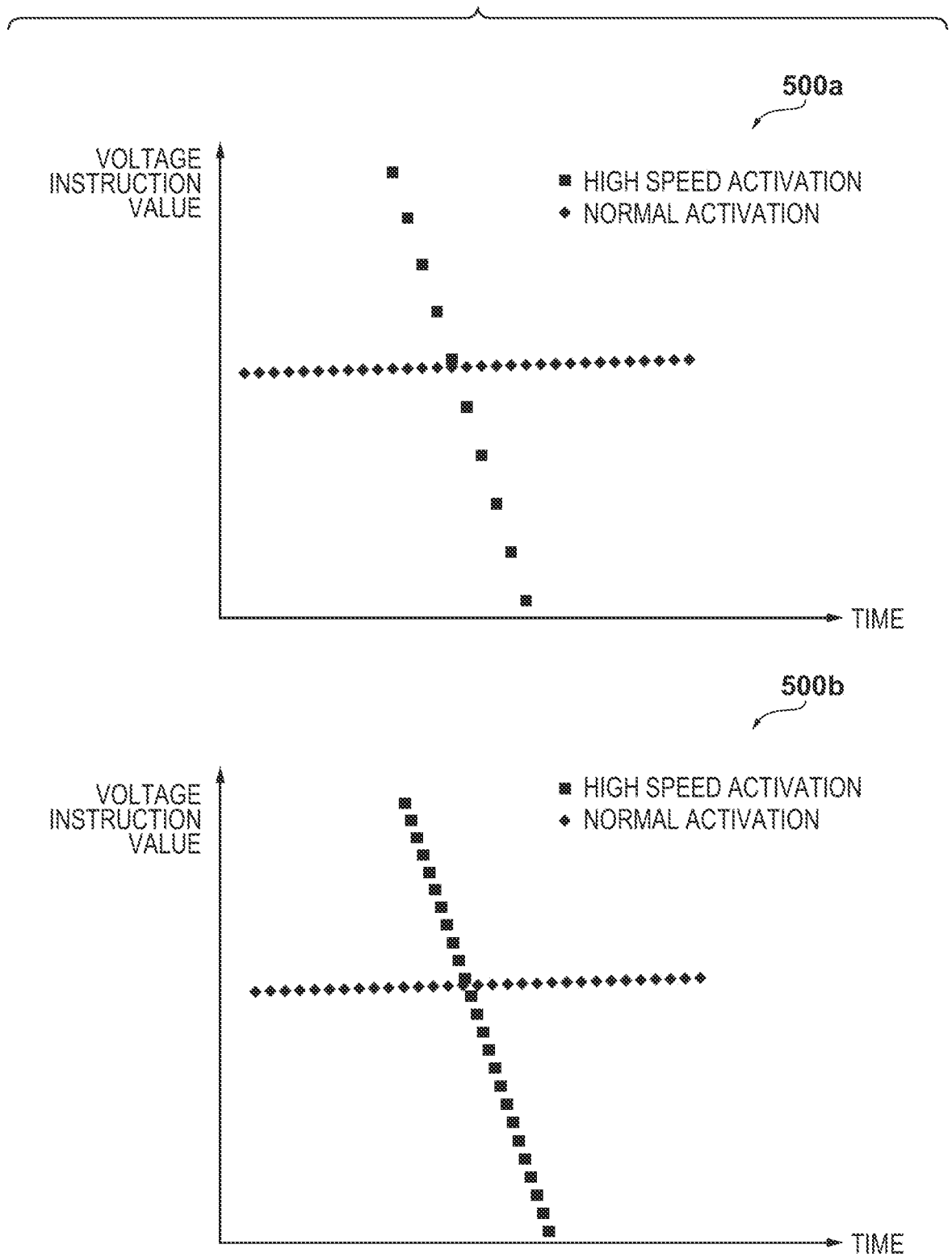
FIG. 5 exemplarily illustrates a sampling result of voltage instruction values in high speed activation and normal activation.

FIG. 5 exemplarily illustrates a sampling result of voltage instruction values in high speed activation and normal activation. A graph 500a is a view for making a comparison by overlapping current waveforms in an amount of time T for both of the graph 400a and the graph 400b. As described above, in the case where the control periods for normal activation and high speed activation are the same, high speed activation has severe current change per unit time. Accordingly, change of a voltage instruction value for each control period gets large. As a result, there is the possibility that the motor will not be able to follow the voltage instruction values, and activation will fail (loss of synchronism).

Accordingly, in the first embodiment, consideration is given to shortening the control period in high speed activation. For example, the control period is reduced to 50% or less (a sampling speed is doubled or more than doubled). The graph 500b is a view that exemplarily illustrates a sampling result for voltage instruction values when the sampling speed is increased to 2.5 times its original value. In this way, by increasing the sampling speed, it is possible to lessen change of the voltage instruction value every control period, and it is possible to lessen the chance of failure when activating the motor (loss of synchronism).

Figure 6:
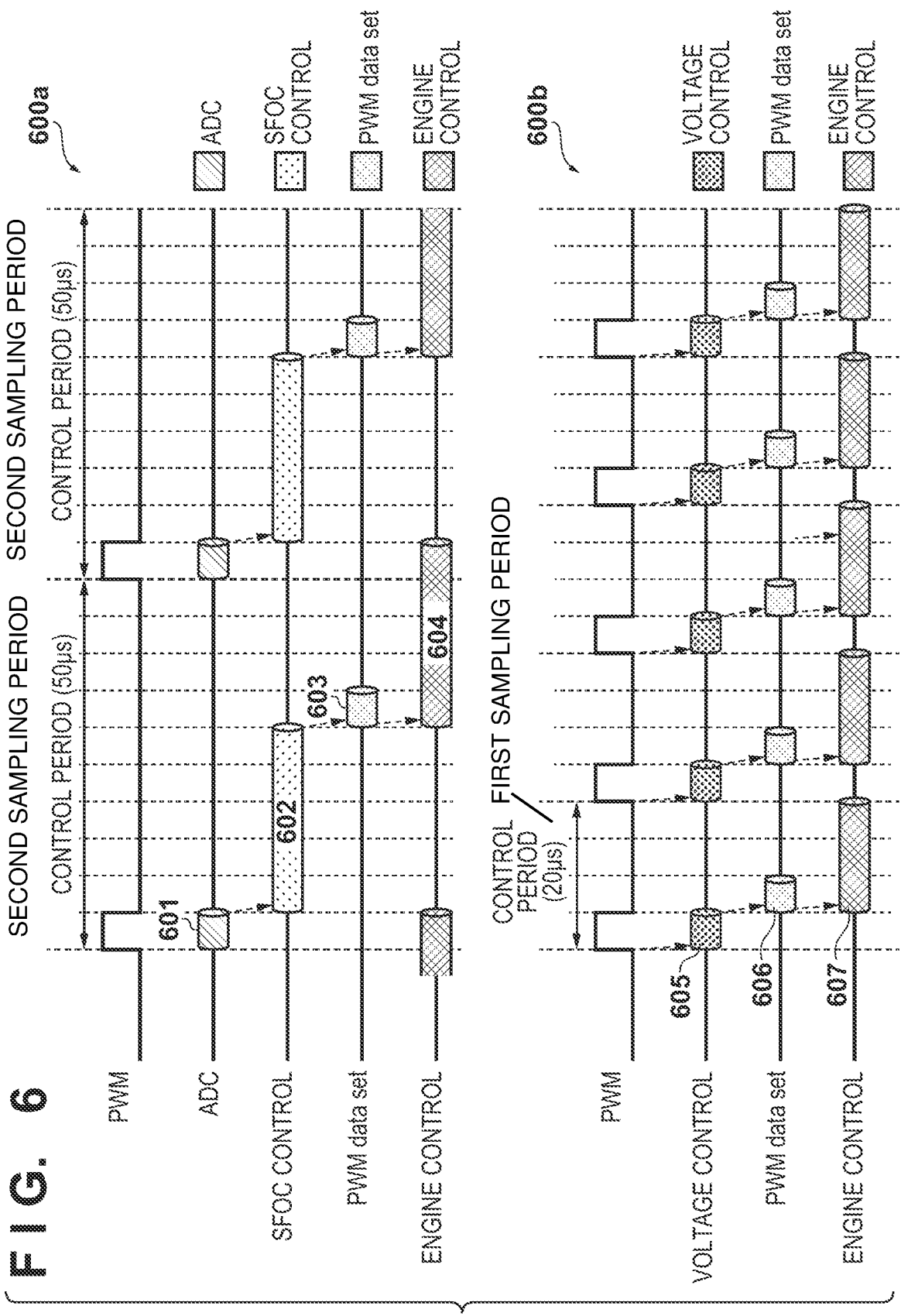
FIG. 6 is a view for describing a control mode of a motor in the first embodiment.

FIG. 6 is a view for describing a control mode of a motor in the first embodiment. A graph 600a illustrates timings for each process in the control unit 200 when sensorless vector control is performed, and a graph 600b illustrates timings for each process in the control unit 200 when forced commutation control is performed.

Note that, in FIG. 6, "PWM" indicates a process for a DC-AC conversion for supplying a current to the motor. "ADC" indicates an analog to digital conversion process for detecting a motor current. "SFOC (Sensorless Field Oriented Control) control" indicates something for motor control. For example, control for processes for a reverse coordinate conversion (a stationary coordinate conversion and a two-phase to three-phase conversion), current control, speed control, speed estimation, and coordinate conversions (a three-phase to two-phase conversion and a rotation coordinate conversion) which are necessary for sensorless vector control are executed. "PWM data set" indicates a PWM data output process. "Engine control" indicates a process for various control other than motor control in the image forming apparatus.

Here, it is assumed that each process for "PWM", "ADC" and "PWM data set" is executed by hardware. In addition, it is assumed that "SFOC control" and "engine control" are software processes performed by the control unit 120 (a CPU). In addition, it is assumed that, while software processes cannot be executed simultaneously (in parallel), hardware processes can be executed simultaneously, and control for these processes is performed at a period of 50 vs.

The graph 600a illustrates timings for each process when sensorless vector control is being executed. Firstly, an ADC process 601 for detecting a motor current is executed by hardware. Note that during the ADC process 601, the CPU is continuing to execute engine control started in a previous process cycle in parallel, and it is assumed that this engine process completes during the ADC process. When the ADC process 601 ends, the CPU accepts an interrupt signal, and starts SFOC control 602. When the SFOC control 602 completes, simultaneously with starting a PWM data output process 603 next, engine control 604 restarts in parallel.

In sensorless vector control, it is necessary to execute SFOC control (in other words, processes such as coordinate conversion, speed estimation, speed control, or current control which start after reading of phase current values of the motor). Here, an amount of time required for an SFOC control process is assumed to be 25 μs. This occupies 50% of CPU processing. Engine control is performed with the remaining 50%.

The graph 600b illustrates timings for each process when forced commutation control is being executed. In forced commutation control, it is not necessary to read current values or execute coordinate conversion, speed estimation, speed control, or current control. There is only the output of a predetermined voltage instruction value by a reverse coordinate conversion (referred to as "voltage control"). Consequently, in forced commutation control, voltage control 605 is executed without an ADC process 601 being executed, then a PWM data output process 606 starts, and engine control 607 restarts in parallel with this.

Because the voltage control 605 only performs a reverse coordinate conversion on a voltage instruction value, the process completes in a shorter amount of time (5 μs here) than that for the SFOC control 602. Subsequently, after an engine control process (15 μs here) ends, the next cycle starts immediately. By this, it is possible to have a short control period (20 μs here). By shortening the control period, discretization of a voltage instruction value is reduced when high speed activation is being performed, and it is possible to decrease a reduction in accuracy.

Note that numerical values for control periods in the above description are merely examples. Any value may be used if the control period for forced commutation control is set smaller than the control period for sensorless vector control. For example, the control period may be decided so as to keep an occupation rate of the CPU for a motor control process to less than or equal to 50% which is equivalent to when sensorless vector control is being performed. In addition, for example, if the processing time of voltage control 605 is 5 µs, the occupation rate of the CPU for a motor control process may be set to 50% (5 µs out of a total of 10 µs) by setting the processing time of the engine control 607 to 5 µs.

In addition, although description was given above regarding a method for determining a control period in accordance with a CPU occupation rate and a computational load in accordance with a software process, the control period may be decided by another method. For example, configuration may be taken to execute a process regarding sensorless vector control by hardware, and decide the control period in accordance with a delay time until processing by sensorless vector control and forced commutation control completes (decided by a number of pipeline steps and a clock frequency). In addition, configuration may be taken to allow switching between "normal activation" in which the control period is fixed, and "high speed activation" in which the control period is variable, in accordance with a setting for when the apparatus is activated, usable power, or the like.

By virtue of the first embodiment as described above, in motor control, motor driving in accordance with forced commutation control is performed at a time of activation, and a transition is made to motor driving in accordance with sensorless vector control after a predetermined rotation speed of the motor is reached. In addition, configuration is taken such that the control period in forced commutation control is shorter than the control period in sensorless vector control. Consequently, it is possible to shorten the activation time of a motor, and it is possible to increase the accuracy of control by reducing discretization of voltage instruction values. As a result, it is possible to shorten a first print output time (FPOT) by a laser beam printer, for example.

Second Embodiment

In the second embodiment, description is given regarding a method for switching control in a stepwise fashion. More specifically, a time period for PI (proportional-integral) control in accordance with reading of a motor current value is provided between a time period for forced commutation control and a time period for sensorless vector control in the first embodiment. Note that description is omitted for configurations similar to those in the first embodiment (FIG. 1 through FIG. 6).

<Operation of Apparatus>

Figure 7:
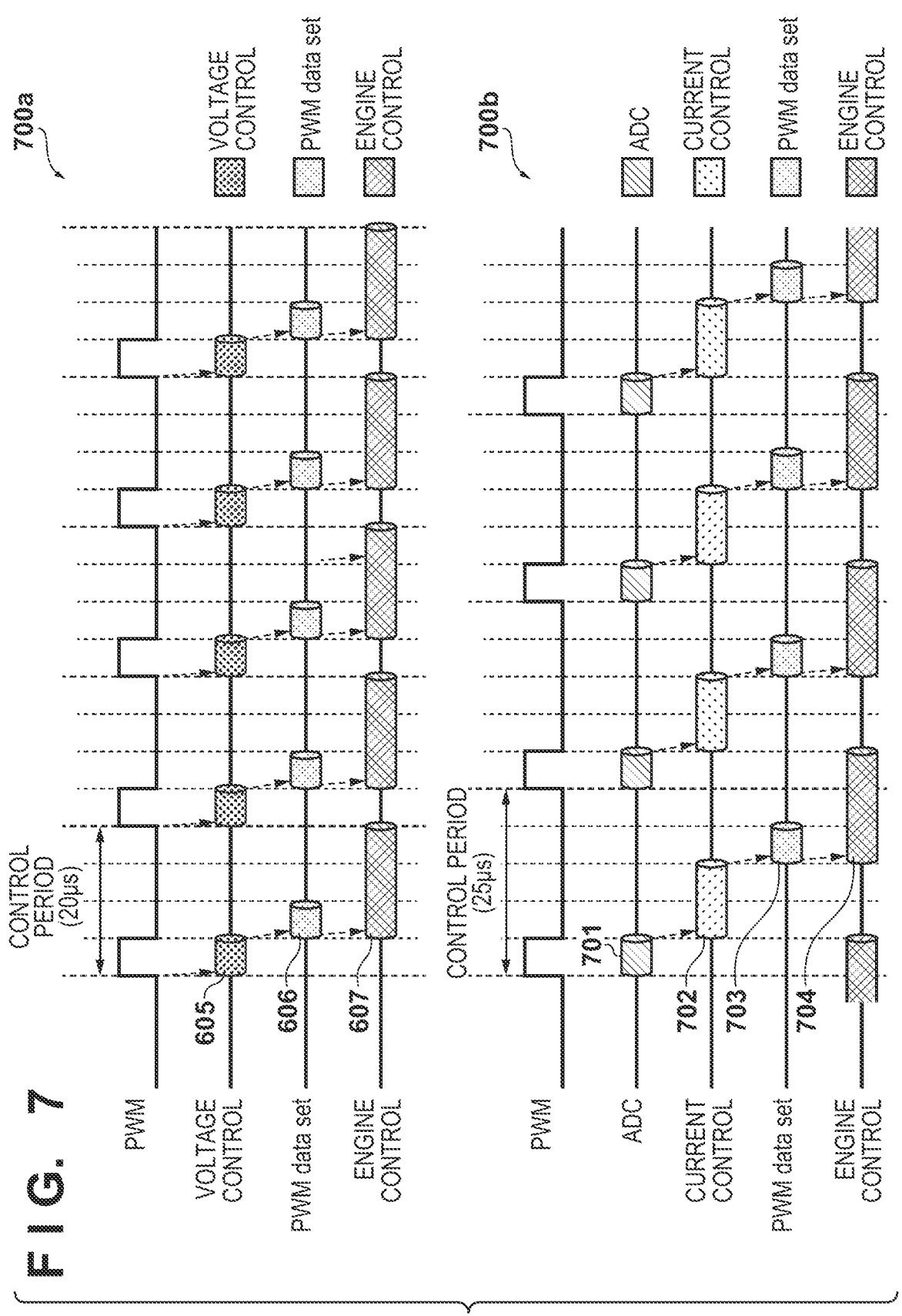
FIG. 7 is a view for describing a control mode of the motor in the second embodiment.

FIG. 7 is a view for describing a control mode of the motor in the second embodiment. A graph 700a illustrates timings of each process in "forced commutation control" which is a first control. A graph 700b illustrates timings of each process in "PI control" which is a second control. Note that description is omitted for sensorless vector control as it is the same as in the first embodiment (the graph 600a).

"Forced commutation control" is a control method for making a control period be as short as possible, similarly to in the first embodiment. Because an initial time period for the rotation speed to increase a certain degree from a motor stop state has the most severe current change, the accuracy of control improves by shortening the control period as much as possible.

"PI control" is a control method for performing a coordinate conversion on a current value read from a motor, and using the current controller 262 to execute current control. Firstly, an ADC process 701 for reading current values supplied to the motor is executed. The current values read are used to calculate data to be set to the PWM control circuit by the subsequent current control 702. When the current control completes, simultaneously to starting a PWM data output process 703, engine control 704 restarts in parallel.

In the computation of the current control 702, first, the read current values are subject to coordinate conversions by the three-phase to two-phase converter 220 and the rotational coordinate converter 230 to obtain the d-axis current value id and the q-axis current value iq. Next, the d-axis current operation amount vd and the q axis current operation amount vq are obtained from target values for a d-axis current and a q-axis current, and the current d-axis current value id and q-axis current value iq that were previously calculated. Finally, a reverse coordinate conversion using the stationary coordinate converter 270 and the two-phase to three-phase converter 280 is executed to calculate data to set to the PWM control circuit.

Note that, in PI control, because, for example, a coordinate conversion for read current values is executed in current control, the processing time becomes longer than voltage control (5 µs here), in forced commutation control. However, because a speed estimate computation is not executed by the estimation computator 240, a computational load is lighter than for SFOC control in sensorless vector control, and the processing time is short (10 µs here). Consequently, it is possible to perform feedback control of motor currents without the control period (25 µs here) lengthening too much.

By virtue of the second embodiment as described above, in motor control, motor driving in accordance with forced commutation control is performed at a time of activation, and a transition is made to motor driving in accordance with sensorless vector control after a predetermined rotation speed of the motor is reached. In addition, current control (PI control) is executed before switching to sensorless vector control. By this, it is possible to improve the ability to track the motor.

Third Embodiment

In the third embodiment, description is given regarding another method for switching control in a stepwise fashion. More specifically, a time period for "PI control+α" is provided between the time period for PI control and the time period for sensorless vector control in the second embodiment. Here, the "α" indicates one or more extra processing. Note that description is omitted for configurations similar to that in the embodiments described above (FIG. 1 through FIG. 7).

Figure 8:
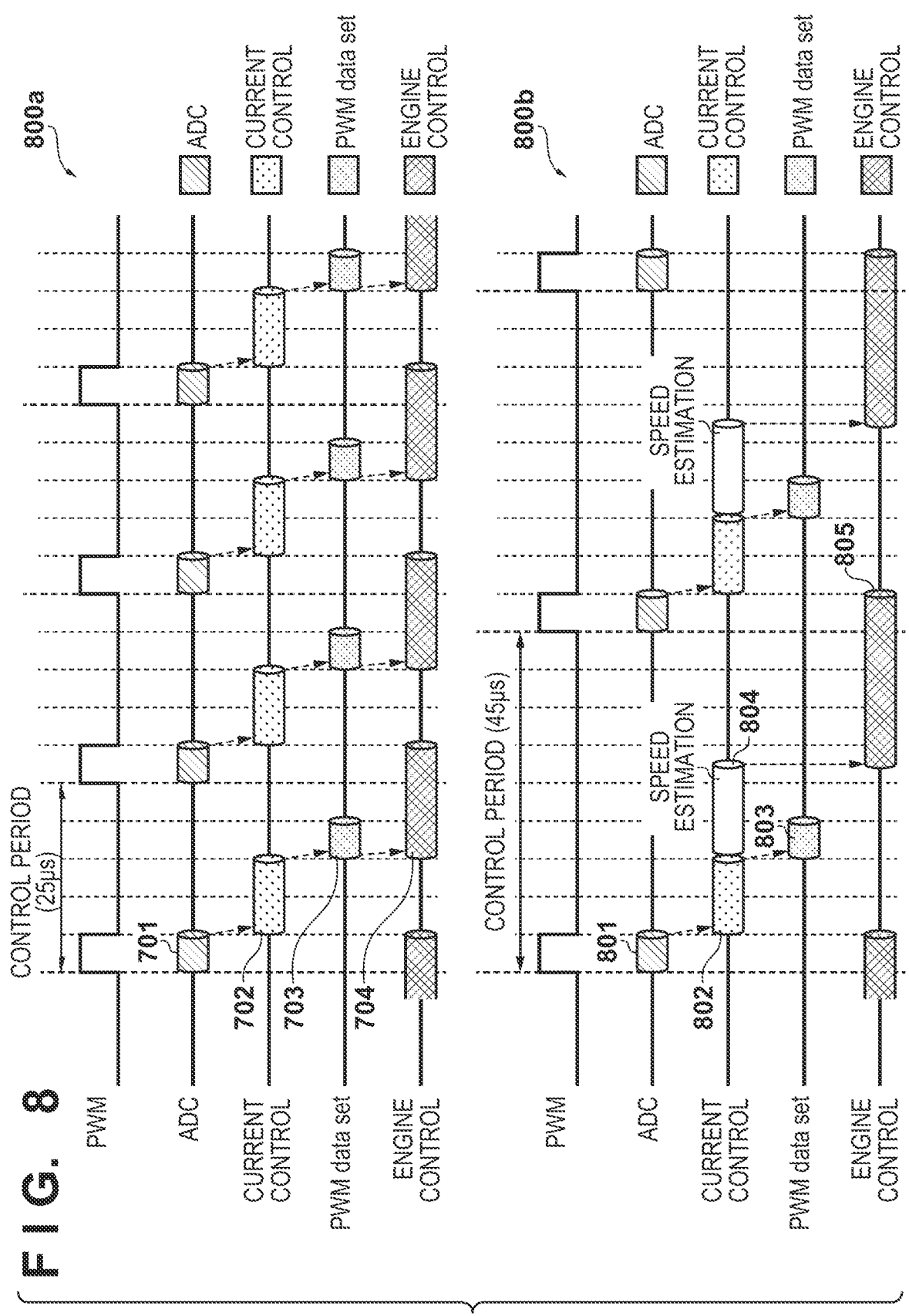
FIG. 8 is a view for describing a control mode of the motor in the third embodiment.

FIG. 8 is a view for describing a control mode of the motor in the third embodiment. A graph 800a illustrates timings of each process in "PI control" which is a second control, and is similar to the graph 700b. A graph 800b illustrates timings of each process in "PI control+α" which is a third control. Note that description is omitted for sensorless vector control as it is the same as in the first embodiment (the graph 600a).

As described above, "PI control" is a control method for shortening a control period by omitting speed estimation and speed control from sensorless vector control and performing PI control on currents, similarly to in the second embodiment (the graph 700b). It is possible to improve the accuracy of control by shortening the control period.

The "PI control+α" illustrated in the graph 800b is a control method for executing a speed estimate which is a process included in "sensorless vector control", in addition to "PI control". In a control cycle, firstly, an ADC process 801, current control 802, and a PWM data output process 803 for reading the current values supplied to the motor are sequentially executed. After the current control 802 completes, the estimation computator 240 is used by a speed estimate 804 to execute a speed estimate computation. When the speed estimate 804 completes, engine control 805 restarts. Note that, while speed estimation is executed, speed control by the speed controller 261 that uses this result is not executed. Accordingly, in comparison with sensorless vector control (the graph 600a), there is a lighter computational load, and the processing time is shorter (45 μs here).

By virtue of the third embodiment as described above, in motor control, motor driving in accordance with forced commutation control is performed at a time of activation, and a transition is made to motor driving in accordance with sensorless vector control after a predetermined rotation speed of the motor is reached. In addition, current control and speed estimation (PI control+α) is executed for a few cycles, for example, before switching to sensorless vector control. By this, it is possible to attempt a speed estimate a few cycles before transitioning to sensorless vector control, and it is possible to switch to sensorless vector control after an estimation result stabilizes. Accordingly, it is possible to realize smoother switching to sensorless vector control.

Fourth Embodiment

In the fourth embodiment, description is given regarding a method for sequentially switching four types of control modes described by the first through third embodiments. More specifically, four types of control modes: "forced commutation control", "PI control", "PI control+α", and "sensorless vector control", are sequentially switched and used.

Figure 9:
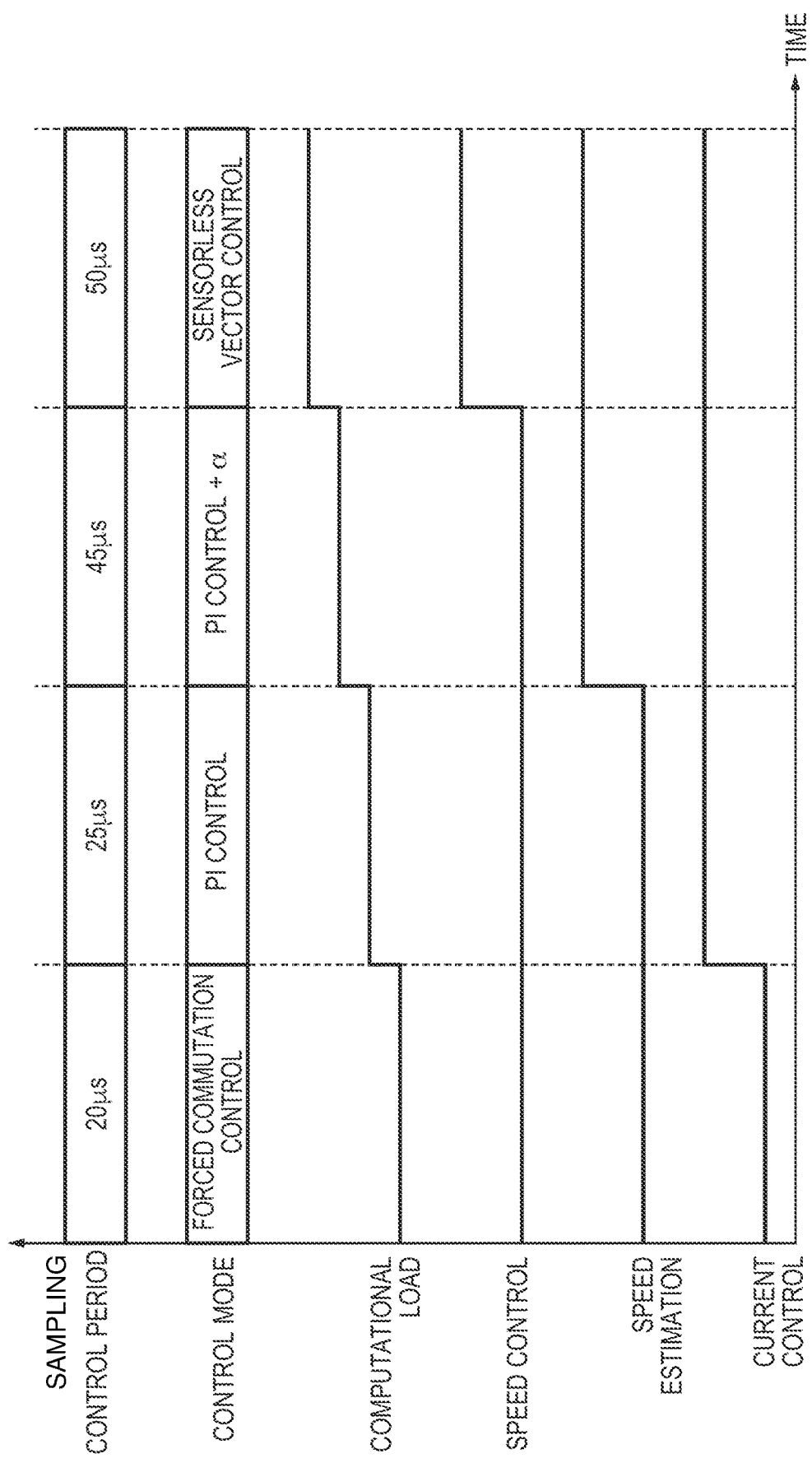
FIG. 9 is a view for exemplarily illustrating transition of motor control in a fourth embodiment.

FIG. 9 exemplarily illustrates transitions of motor control in the fourth embodiment. "Forced commutation control" is a control method for having a control period be as short as possible (20 μs) by omitting all unnecessary processes. "PI control" is a control method for executing current control and reading of current values in conjunction. By this, it is possible to have feedback control for motor currents in a moderately long control period (25 μs). "PI control+α" is a control method for further executing a speed estimate in addition to "PI control". By attempting speed estimation for a few cycles, convergence of estimation results is confirmed. However, because speed control that is based on a speed estimate is not executed, the control period (45 μs) can be set shorter than for sensorless vector control. Once the speed estimation result has stabilized, sensorless vector control is switched to, and the control period becomes 50 μs.

By virtue of the fourth embodiment as described above, in motor control, motor driving in accordance with forced commutation control is performed at a time of activation, and a transition is made to motor driving in accordance with sensorless vector control after a predetermined rotation speed of the motor is reached. In addition, the four types of control modes are sequentially switched as time elapses (as the rotation speed increases). By this, it is possible to improve ability to track a motor, and it is also possible to realize smoother switching of control modes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-076243, filed Apr. 11, 2018 which is hereby incorporated by reference herein in its entirety.

What is claimed is:

1. A motor control apparatus operable to control a motor, the apparatus comprising:
    one or more memories connected to one or more processors configured to function as:
    a transition unit configured to transit control between first drive control for driving the motor by forces commutation control and second drive control for driving the motor by vector control; and
    a control unit configured to control to drive the motor by one of the first drive control and the second drive control,
    wherein
    a first sampling period of the first drive control is shorter than a second sampling period of the second drive control.

2. The motor control apparatus according to claim 1, further comprising:
    a detection unit configured to detect a current supplied to the motor; and
    an estimation unit configured to estimate a rotation speed of the motor from the current detected by the detection unit,
    wherein the second drive control unit performs the vector control based on the rotation speed estimated by the estimation unit.

3. The motor control apparatus according to claim 1, wherein
    the control unit performs control to drive the motor by the first drive control if a rotation speed of the motor is less than a predetermined threshold value, and performs control to drive the motor by the second drive control if the rotation speed of the motor is greater than or equal to the predetermined threshold value.

4. The motor control apparatus according to claim 1, wherein the first sampling period is determined based on an amount of time required for control of the motor in the first drive control, and an amount of time required for control other than control of the motor, and the second sampling period is determined based on an amount of time required for control of the motor in the second drive control, and an amount of time required for control other than control of the motor.

5. The motor control apparatus according to claim 1, further comprising:

a detection unit configured to detect a current supplied to the motor, wherein the transition unit further configured to transit control among the first drive control, the second drive control, and a third drive control for driving the motor by PI control based on the current detected by the detection unit, wherein a third sampling period of the third drive control is longer than the first sampling period and shorter than the second sampling period, and the control unit controls to drive the motor by one of the first drive control, the second drive control, and the third drive control.

6. The motor control apparatus according to claim 5, wherein the control unit:

controls to drive the motor by the first drive control if a rotation speed of the motor is less than a first threshold value, controls to drive the motor by the third drive control if the rotation speed of the motor is greater than or equal to the first threshold value and less than a second threshold value which is larger than the first threshold value, and controls to drive the motor by the second drive control if the rotation speed of the motor is greater than or equal to the second threshold value.

7. The motor control apparatus according to claim 5, further comprising:

an estimation unit configured to estimate a rotation speed of the motor from the current detected by the detection unit, wherein the transition unit further configured to transit control among the first drive control, the second drive control, the third drive control, and a fourth drive control for executing estimation by the estimation unit in addition to driving of the motor by the PI control, wherein a fourth sampling period of which is a control period in which the fourth drive control is longer than the third sampling period and shorter than the second sampling period, and the control performs control for driving the motor by one of the first drive control, the second drive control, the third drive control, and the fourth drive control.

8. The motor control apparatus according to claim 7, wherein the control unit:

controls to drive the motor by the first drive control if the rotation speed of the motor is less than a first threshold value, controls to drive the motor by the third drive control if the rotation speed of the motor is greater than or equal to the first threshold value and less than a second threshold value which is larger than the first threshold value, controls to drive the motor by the fourth drive control if the rotation speed of the motor is greater than or equal to the second threshold value and less than a third threshold value which is larger than the second threshold value, and controls to drive the motor by the second drive control if the rotation speed of the motor is greater than or equal to the third threshold value.

9. A method of controlling a motor control apparatus operable to control a motor, the motor control apparatus comprising:

a transition unit configured to transit control between first drive control for driving the motor by forces commutation control and second drive control for driving the motor by vector control, and the method comprising:

performing first control to drive the motor in a first sampling period by the first drive control; and performing second control to drive the motor in a second sampling period by the second drive control, wherein the second sampling period is longer than the first sampling period.

10. The method according to claim 9, further comprising:

detecting a current supplied to the motor; and estimating a rotation speed of the motor from the detected current, wherein, the second drive control performs the vector control based on the estimated rotation speed.

11. The method according to claim 9, wherein the first control is executed if a rotation speed of the motor is less than a predetermined threshold value, and the second control is executed if the rotation speed of the motor is greater than or equal to the predetermined threshold value.

12. The method according to claim 9, wherein the first sampling period is determined based on an amount of time required for control of the motor in the first drive control, and an amount of time required for control other than control of the motor, and the second sampling period is determined based on an amount of time required for control of the motor in the second drive control, and an amount of time required for control other than control of the motor.

13. The method according to claim 9, wherein the transition unit further configured to transit control among the first drive control, the second drive control, and a third drive control for driving the motor by PI control based on a current supplied to the motor, and the method further comprises:

detecting a current supplied to the motor; and performing third control to drive the motor in a third sampling period by the third drive control, wherein the third sampling period is longer than the first sampling period and shorter than the second sampling period.

14. The method according to claim 13, wherein the first control is executed if a rotation speed of the motor is less than a first threshold value, the third control is executed if the rotation speed of the motor is greater than or equal to the first threshold value and less than a second threshold value which is larger than the first threshold value, and the second control is executed if the rotation speed of the motor is greater than or equal to the second threshold value.

15. The method according to claim 13, wherein
the transition unit further configured to transit control among the first drive control, the second drive control, the third drive control, and a fourth drive control for executing estimation of a rotation speed of the motor based on a current supplied to the motor, in addition to driving of the motor by the PI control
and
the method further comprises:
performing fourth control to drive the motor in a fourth sampling period by the fourth drive control,
wherein the fourth sampling period is longer than the third sampling period and shorter than the second sampling period.

16. The method according to claim 15, wherein
the first control is executed if a rotation speed of the motor is less than a first threshold value,
the third control is executed if the rotation speed of the motor is greater than or equal to the first threshold value and less than a second threshold value which is larger than the first threshold value,
the fourth control is executed if the rotation speed of the motor is greater than or equal to the second threshold value and less than a third threshold value which is larger than the second threshold value, and
the second control is executed if the rotation speed of the motor is greater than or equal to the third threshold value.

17. A non-transitory computer-readable recording medium storing a program that causes a computer to function as a motor control apparatus operable to control a motor, the apparatus comprising:
a transition unit configured to transit control between first drive control for driving the motor by forces commutation control and second drive control for driving the motor by vector control; and
a control unit configured to control to drive the motor by one of the first drive control and the second drive control,
wherein
a first sampling period of the first drive control is shorter than a second sampling period of the second drive control.

18. The medium according to claim 17,
wherein the motor control apparatus further comprises:
a detection unit configured to detect a current supplied to the motor; and
an estimation unit configured to estimate a rotation speed of the motor from the current detected by the detection unit,
wherein the second drive control performs the vector control based on the rotation speed estimated by the estimation unit.

19. The medium according to claim 17, wherein
the control unit performs control to drive the motor by the first drive control if the rotation speed of the motor is less than a predetermined threshold value, and performs control to drive the motor by the second drive control if the rotation speed of the motor is greater than or equal to the predetermined threshold value.

20. The medium according to claim 17, wherein
the first sampling period is determined based on an amount of time required for control of the motor in the first drive control, and an amount of time required for control of the motor other than control of the motor, and
the second sampling period is determined based on an amount of time required for control of the motor in the second drive control, and an amount of time required for control of the motor other than control of the motor.

* * * * *